(12) United States Patent
Anthoine

(10) Patent No.: US 8,464,776 B2
(45) Date of Patent: Jun. 18, 2013

(54) VISCOELASTIC TRANSMISSION DEVICE FOR A ROLLER SHUTTER ACTUATOR

(75) Inventor: Sebastien Anthoine, Sallanches (FR)

(73) Assignee: Somfy SAS, Cluses (FR)

( * ) Notice: Subject to any disclaimer, the term of this patent is extended or adjusted under 35 U.S.C. 154(b) by 31 days.

(21) Appl. No.: 12/760,952

(22) Filed: Apr. 15, 2010

(65) Prior Publication Data

US 2010/0279779 A1 Nov. 4, 2010

(30) Foreign Application Priority Data

Apr. 30, 2009 (FR) ...................................... 09 02108

(51) Int. Cl.
*E06B 9/72* (2006.01)

(52) U.S. Cl.
USPC ............................................. 160/310; 464/75

(58) Field of Classification Search
USPC .................. 160/323.1, 310, 296; 464/73, 74, 464/75, 157
See application file for complete search history.

(56) References Cited

U.S. PATENT DOCUMENTS

| 1,780,727 A | 9/1926 | Tenney |
| 2,159,235 A | 5/1939 | Tyler et al. |
| 4,159,162 A | 6/1979 | Christoffel |
| 4,357,137 A * | 11/1982 | Brown .............................. 464/75 |
| 4,615,371 A * | 10/1986 | Clauss ............................. 160/22 |
| 5,966,996 A * | 10/1999 | Hamaekers .................. 74/574.4 |
| 6,979,962 B2 | 12/2005 | Cavarec et al. |
| 7,244,186 B2 * | 7/2007 | Hauck .............................. 464/75 |
| 7,625,290 B2 * | 12/2009 | Hodjat et al. .................... 464/75 |

FOREIGN PATENT DOCUMENTS

| DE | 19618635 C | 5/1997 |
| DE | 19736770 C | 3/1999 |
| GB | 2016649 A | 9/1979 |
| WO | WO 2006/032761 A | 3/2006 |

OTHER PUBLICATIONS

Search Report issued by French Patent Office for priority French application 09 02108 mailed Dec. 1, 2009.

* cited by examiner

*Primary Examiner* — David Purol

(74) *Attorney, Agent, or Firm* — Frommer Lawrence & Haug LLP; Ronald R. Santucci

(57) ABSTRACT

Viscoelastic transmission device (100) for a mechanical connection between a shaft (4) of an actuator the axis (XX') of which defines an axial direction, and a driving wheel (6) of a winding tube (5) of a blind, of a roller shutter or of a roll-up screen, which comprises a first component (10) that has an output profile that complements an input profile of a second component of the device, the first and the second components adhering to an intermediate component (30) made of viscoelastic material.

8 Claims, 3 Drawing Sheets

VISCOELASTIC TRANSMISSION DEVICE FOR A ROLLER SHUTTER ACTUATOR

BACKGROUND OF THE INVENTION

The invention relates to a viscoelastic transmission device which, inside a winding tube for a blind, for a roller shutter or for a roll-up screen, provides the mechanical connection between the shaft of an actuator and a driving wheel that drives the winding tube.

Winding tubes are not standardized. They have a wide variety of cross sections (circular, pentagonal, hexagonal, octagonal, etc.) and dimensions in an orthogonal cross section.

A driving wheel according to the prior art comprises a housing able to accept an output shaft of the actuator and comprises an exterior profile able to fit inside the winding tube, with a limited clearance between the exterior profile of the wheel and the interior profile of the winding tube.

For one same type of actuator, there are therefore a great many driving wheels, differing only in terms of their exterior profile, each wheel being able to collaborate with one specific winding tube.

In order to prevent actuator vibrations (caused by an electric motor and by reduction gearing) from spreading to the winding tube, or at least to limit this spread, it is known practice to use a driving wheel equipped with a viscoelastic material as a replacement for a driving wheel made of one single material, for example of plastic.

Patent application WO 2006/032761 describes a driving wheel that allows the use of several viscoelastic tiles working in compression and positioned between elastic beam elements.

U.S. Pat. No. 4,159,162 describes a driving wheel with vibration-damping effect that can be fitted into a tube made of rolled sheet, of circular profile, with bend channel.

Patent DE 197 36 770 likewise describes such a driving wheel, with vibration-damping effect. An exterior component has a cross section tailored to that of the winding tube. An interior component of this driving wheel acts as a housing for a splined shaft of the actuator. Torque is transmitted between the shaft and the wheel by direct collaboration of complementary shapes between the splined shaft and the internal profile. The elastic material is firmly attached to the interior component and to the exterior component.

However, this driving wheel is specific to one particular winding tube, for example an octagonal tube made of bent sheet, with bend channel, the wheel having a recess to accommodate the bend channel.

What this means is that there are as many driving wheels with damper to be designed as there are driving wheels without damper, which means an increase in different stock items that is all the more troublesome given that it is difficult to predict which applications will require a damped driving wheel because of special installation requirements.

The driving wheels of the prior art have damping elements that work essentially in compression. A viscoelastic material working in compression is able to transmit a higher load, and therefore a higher actuator torque.

However, the ability of the material to dissipate vibrational energy is much poorer than when the material is working in shear. Conversely, the transmission of shear load is limited by the risks of the material failing (by tearing).

Also known, from document DE 196 18 635, is an elastic transmission coupling of a sewing machine comprising an elastic element equipped with a cylindrical exterior profile with a groove for collaborating with a first shaft and an exterior profile shaped to collaborate with a second shaft that has a bore with internal teeth. Hence, mechanical power can be transferred from the first shaft to the second.

Also known, from document U.S. Pat. No. 1,780,727, is a power transmission device for a motor vehicle. The transmission device is of the type involving obstacles consisting of teeth between which an elastic material designed to damp out jerkiness is located.

Document U.S. Pat. No. 6,979,962 discloses an actuator comprising a motor suspended internally both by an attachment of the viscoelastic type and by a viscoelastic transmission device interposed between the shaft of the motor and the output shaft of the actuator.

It is an object of the invention to provide a device for transmitting mechanical power that overcomes the above disadvantages and improves the mechanical power-transmission devices known from the prior art. In particular, the invention makes it possible to produce a transmission device that is able to limit the diversity of driving wheels that have to be produced for a range of home automation installations.

BRIEF SUMMARY OF THE INVENTION

According to the invention, the viscoelastic transmission device produces a mechanical connection between a shaft of an actuator the axis of which defines an axial direction, and a driving wheel of a winding tube of a blind, of a roller shutter or of a roll-up screen. It comprises a first component that has an output profile that complements an input profile of a second component of the device, the first and the second components adhering to an intermediate component made of viscoelastic material.

The intermediate component may have an axial extension of a length greater than the outside diameter of the device.

The viscoelastic material of the intermediate component may have a greater amount sheared than compressed when a relative rotation is applied between the first component and the second component.

The amount sheared may be more than twice the amount compressed.

The amount compressed may be comprised within a volume at rest that is defined by a first zone comprised between lateral faces of first radial teeth belonging to the first component and lateral faces of second radial teeth belonging to the second component.

The amount sheared may at least be comprised in a volume at rest that is defined by a second zone comprised between first radial teeth belonging to the first component and a hub belonging to the second component and defined by a third zone comprised between second radial teeth belonging to the second component and a head belonging to the first component.

The amount sheared may at least be comprised in a first radial extension and/or in a second radial extension of the intermediate component, the shearing taking place between faces of the first component and of the second component which are perpendicular to the axis.

According to the invention, the home automation installation comprises a transmission device defined hereinabove.

BRIEF DESCRIPTION OF THE DRAWINGS

The invention will be better understood from reading the description which will follow, this being given solely by way of example and with reference to the attached drawings in which.

DETAILED DESCRIPTION

Figure 1:
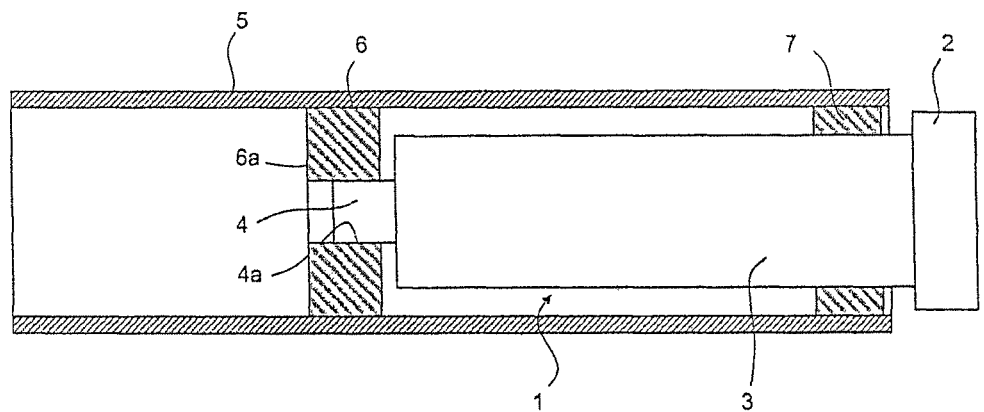
FIG. 1 depicts a home automation installation according to the prior art.

FIG. 1 is a cross section of an installation according to the prior art. The installation comprises a roll-up element of a building, such as a blind, an apron of a roller shutter, a screen, not depicted, that can be wound around a winding tube 5, as described in U.S. Pat. No. 4,159,162.

An electric actuator 1 comprises a fixed end 2, fixed to a rigid structure of the framework. The electric actuator comprises an actuator tube 3 comprising a motor and reduction gearing, neither depicted, an output shaft 4 able to rotate, engaged in a driving wheel 6 itself prevented from rotating with respect to the winding tube 5. An adapter ring 7, able to rotate with respect to the actuator tube 3, acts as a bearing for the winding tube.

An external profile 4a of the output shaft 4 and a recess 6a of the driving wheel 6 have interlocking shapes. Likewise, an external profile of the driving wheel and an internal profile of the winding tube have interlocking shapes.

Figure 2:
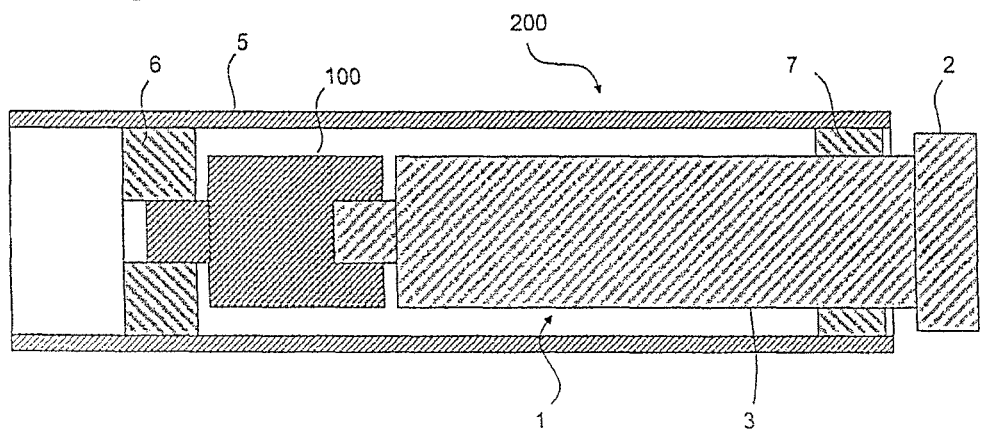
FIG. 2 depicts a home automation installation according to the invention.

FIG. 2 is a cross section through an installation 200 according to the invention. The installation comprises, between the output shaft 4 and the driving wheel 6, a transmission device 100 according to the invention.

Figure 3:
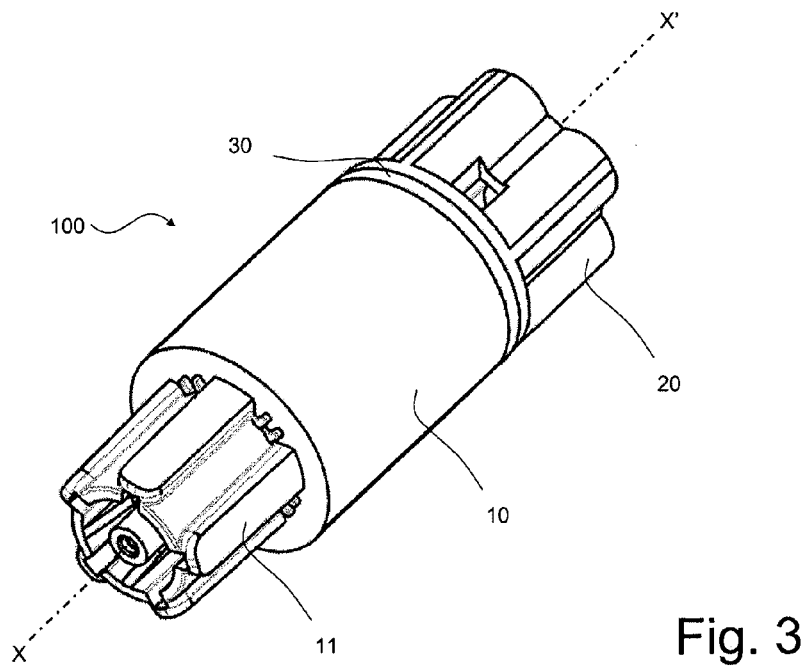
FIG. 3 depicts a viscoelastic transmission device according to the invention.

FIG. 3 depicts the viscoelastic transmission device according to the invention. This device 100 is interposed between the actuator 1 and the driving wheel 6. The device is of tubular shape, and has a length greater than the largest diameter thereof.

In addition, the largest diameter does not exceed the diameter of the actuator tube 3.

Finally, the device can be fitted into the output shaft 4, in place of a driving wheel 6, and can be fitted into a driving wheel, in place of an output shaft.

The device comprises three main components: a first component 10, that has an output profile 11 identical to the output shaft 4 or at least compatible with the output shaft 4, a second component 20 that has an input profile identical to the recess in the driving wheel or at least compatible with the recess in the driving wheel, and finally an intermediate component 30 which is made of viscoelastic material. Once inserted between an actuator and a driving wheel the device is able to rotate about an axis of rotation XX' when driven by the output shaft.

Figure 4:
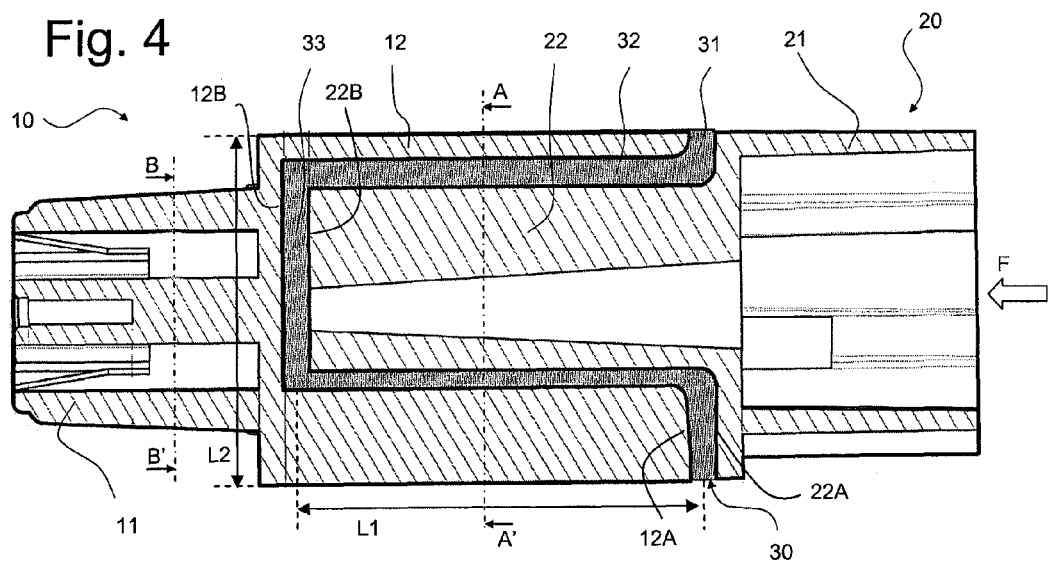
FIG. 4 depicts a cross section of the device on a plane of section containing the axis of rotation thereof.

FIG. 4 is a cross section through the device on a plane of section that contains the axis of rotation XX' thereof. The first component 10 has the output profile 11 and a cover 12 the exterior surface of which is cylindrical.

The second component 20 has an input profile 21 and a connecting shaft 22 able to fit into the cover 12. The intermediate component 30 is positioned between the connecting shaft and the cover. This intermediate component has a first radial extension 31, an axial extension 32 and a second radial extension 33. The mean distance of the axial extension 32 is denoted L1 and the outside diameter of the cover 12 is denoted L2.

Figure 5:
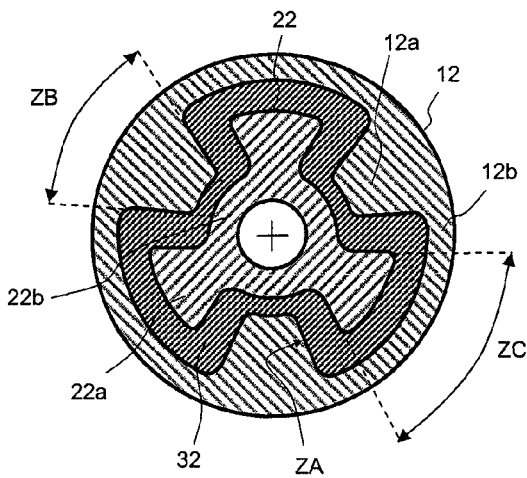
FIG. 5 depicts a first orthogonal cross section of the device.

FIG. 5 is a first orthogonal cross section through the device on a plane of section AA' perpendicular to the axis of rotation XX' and which is central relative to the cover 12. The axis of rotation is represented by a cross. The cover and the connecting shaft are centred on this axis.

The cover 12 comprises first radial teeth 12a connected to a head 12b. The first radial teeth have a cross section of substantially trapezoidal type, with the tooth narrowing in the direction away from the head. The connecting shaft 22 has second radial teeth 22a connected to a hub 22b. The second radial teeth have a cross section of substantially trapezoidal type, with the tooth widening in the direction away from the hub. Each radial tooth comprises one end face and two substantially radial lateral faces. The end face of a tooth preferably has a partially cylindrical surface, centred on the axis of rotation, and characterized by an interior radius in the case of the first teeth and by an exterior radius in the case of the second teeth. The head and the hub are also cylindrical.

The section comprised between the connecting shaft and the cover is entirely occupied by the axial extension 32 of the intermediate component, and therefore by viscoelastic material, depicted in dark hatching. The thickness of the intermediate component is substantially constant, equal to the difference between an exterior radius of the second teeth and an interior radius of the head.

The intermediate component adheres to the connecting shaft on the one hand and to the cover on the other. Adhesion means that there is no slippage between the contacting surfaces. It is obtained by bonding or using an overmoulding technique.

Because of the respective narrowing and widening of the radial teeth of the cover and of the connecting shaft, these teeth have lateral faces which pairwise are substantially parallel in a first zone ZA. This first zone ZA is comprised between the exterior radius of the second radial teeth and the interior radius of the first radial teeth, the radii being measured from the axis of rotation.

A second zone ZB is comprised between the connecting shaft and the cover, in the continuation of a first radial tooth. A third zone ZC is comprised between the connecting shaft and the cover, in the continuation of a second radial tooth.

Upon a relative rotation of the connecting shaft with respect to the cover:
  in each first zone ZA the viscoelastic material is compressed (or, conversely, stretched),
  in each second zone ZB and in each third zone ZC, the viscoelastic material is sheared.

The ability to transmit high torque is afforded by the presence of first zones ZA working in compression.

The ability of the device to absorb vibrational energy, particularly tangential vibration due to fluctuations in the torque of the motor and of the reduction gearing, is afforded by the presence of second zones ZB and third zones ZC working in shear.

The device is such that the amount of viscoelastic material situated in all of the second zones ZB and third zones ZC is at least greater than the amount of viscoelastic material situated in all of the first zones ZA.

For preference, it is twice the amount.

The volume at rest of the second and third zones is therefore at least equal to the volume, and preferably twice the volume, of the first zones.

Likewise, the areas of the facing surfaces of viscoelastic material working in shear are at least equal to the areas of the facing surfaces working in compression, and are preferably twice the area of the facing surfaces working in compression.

The invention has the advantage that the first radial extension 31 and the second radial extension 33 also work in shear, and therefore combine their effects with those of the zones ZB and ZC.

In the case of these radial extensions, the shearing occurs between faces 12A, 12B of the first component and faces 22A, 22B of the second component, these faces preferably being perpendicular to the axis.

Thus, the viscoelastic material of the intermediate component has a considerably greater amount sheared than compressed when a relative rotation is applied between the first component and the second component.

In addition, the length L1 of the axial extension 32 is greater than the diameter L2 of the cover. This diameter L2 is also the outside diameter of the device.

This condition makes it possible considerably to limit the tolerated relative angling or gradient of the connecting shaft with respect to the cover, thus avoiding any significant offset between the actual axis of these components and the axis of rotation.

Such an offset would result in a needless dissipation of energy and in premature wearing of the device.

For preference, the device is manufactured by a first overmoulding of the intermediate component 30 onto the second component 20, then a second overmoulding of the first component 10 onto the subassembly produced from the first overmoulding operation. This then guarantees perfect adhesion of the intermediate component to the connecting shaft and to the cover and correct shear behaviour thereof.

Figure 6:
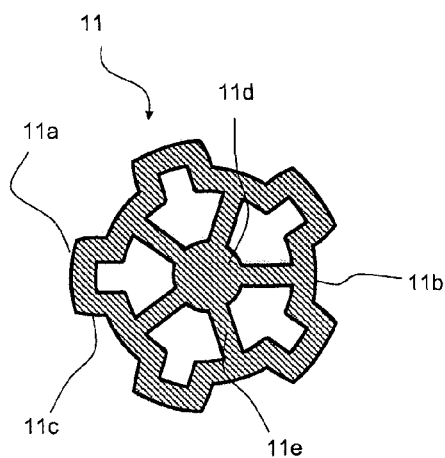
FIG. 6 depicts a second orthogonal cross section of the device.

FIG. 6 depicts a second orthogonal cross section through the device on a plane of section BB' perpendicular to the axis of rotation situated substantially one third of the way along the output profile 11.

This output profile comprises a ring which is splined in the axial direction, formed of a succession of reliefs 11a and of recesses 11b which are connected by shoulders 11c. A solid hub 11d is connected to the splined ring by radial connections 11e. This configuration is identical, at least in terms of its external part, to that of the output shaft 4 of an actuator. The output profile is therefore able to be inserted into the recess 6a of a driving wheel.

Figure 7:
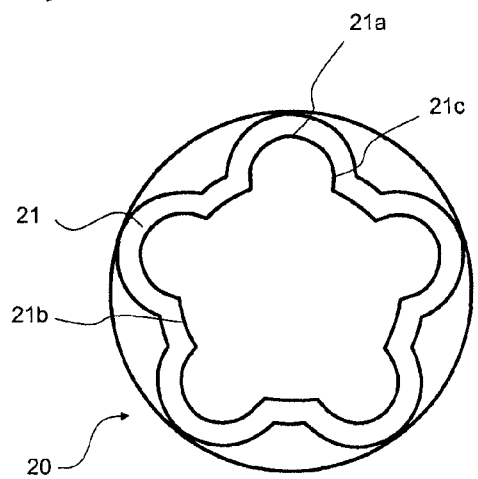
FIG. 7 depicts a view of the device along its axis of rotation.

FIG. 7 depicts a view of the device along its axis of rotation XX', as depicted in FIG. 4 by the solid arrow F. The visible part is therefore the end of the connecting shaft 20 and the input profile 21. In its interior part, the latter comprises semicircles 21a connected to an interior circle 21a by straight portions 21c. The output profile complements the input profile inasmuch as an output profile can fit inside an input profile with limited clearance, the shoulders 11c coming into contact with the straight portions 21c.

The input profile is therefore similar to the recess 6a of the driving wheel and able to accommodate the external profile 4a of the output shaft 4 of an actuator.

Figure 8:
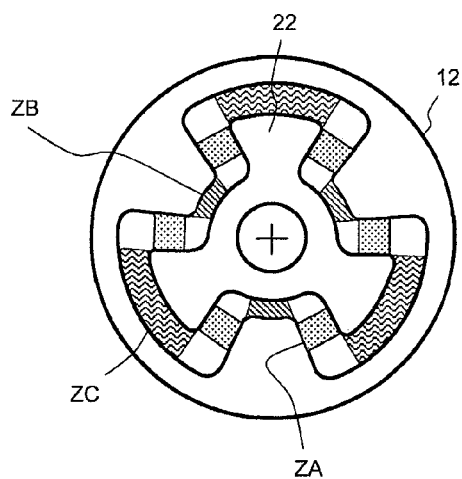
FIG. 8 depicts zones of operation of the transmission device according to the invention.

FIG. 8 more specifically delimits the zones that operate in compression or in shear as described in FIG. 5. The zones ZA that work in compression are depicted covered in dots. The zones ZB that work in shear are shown with regular oblique hatching and the zones ZC that work in shear are shown covered with chevron shading.

The regions of viscoelastic material which do not form part of these three zones experience complex deformations that cannot be attributed to a shear type or to a compression type.

As far as the zones ZA and radial continuation thereof are concerned, there is also a shear component between the exterior radius of the hub 22b and the interior radius of the head, but because of the relative distances between the moving surfaces, this shear component is of a second order of magnitude by comparison with the compression component (the thickness of material between the exterior radius of the hub and the interior radius of the head is at least three times the distance between opposing faces of the teeth).

The elastomeric material of the intermediate component 30 has a hardness preferably less than or equal to 60 Shore. Polyurethane for example is used. The first component 10 and the second component 20 are preferably made of a filled plastic, for example of the PA66GF50 type.

The device according to the invention overcomes the disadvantages mentioned by allowing a simple interfacing between an actuator and a whole range of damper-less driving wheels suited to this actuator, while at the same time allowing the transmission of a great deal of torque and better damping as the viscoelastic material is stressed mainly in terms of shear.

The invention claimed is:

1. A home automation installation, the installation comprising an actuator having an output shaft and a driving wheel secured to a winding tube of a blind, of a roller shutter or of a roll-up screen, the output shaft being secured to the driving wheel by a transmission device comprising a viscoelastic transmission device comprising a first component that has an output profile that complements an input profile of a second component of the device, the first and the second components adhering to an intermediate component made of viscoelastic material, wherein adhering so there is substantially no slippage between contacting surfaces of the first component and second component with the intermediate component.

2. home installation according to claim 1, wherein the intermediate component has an axial extension of a length greater than the outside diameter of the viscoelastic transmission device.

3. The home automation installation according to claim 1, wherein the viscoelastic material of the intermediate component has a greater amount sheared than compressed when a relative rotation is applied between the first component and the second component.

4. The home automation installation according to claim 3, wherein the amount sheared is more than twice the amount compressed.

5. The home automation installation according to claim 1, wherein an amount of the viscoelastic material compressed is comprised within a volume at rest that is defined by a first zone comprised between lateral faces of first radial teeth belonging to the first component and lateral faces of second radial teeth belonging to the second component.

6. The home automation installation according to claim 1, wherein an amount of the viscoelastic material sheared is at least comprised in a volume at rest that is defined by a second zone comprised between first radial teeth belonging to the first component and a hub belonging to the second component and defined by a third zone comprised between second radial teeth belonging to the second component and a head belonging to the first component.

7. The home automation installation according to claim 1, wherein an amount of the viscoelastic material sheared is at least comprised in either a first radial extension or in a second radial extension, or the first radial extension and the second radial extension, of the intermediate component, the shearing taking place between faces of the first component and faces of the second component which are perpendicular to an axial axis of the output shaft.

8. The home automation installation according to claim 1, wherein the first and second components are bonded to the intermediate component.

\* \* \* \* \*

UNITED STATES PATENT AND TRADEMARK OFFICE
CERTIFICATE OF CORRECTION

PATENT NO. : 8,464,776 B2
APPLICATION NO. : 12/760952
DATED : June 18, 2013
INVENTOR(S) : Sebastien Anthoine It is certified that error appears in the above-identified patent and that said Letters Patent is hereby corrected as shown below:

In the Claims

In claim 2, appearing at column 6, line 34, change "home installation" to --The home automation installation--.

Signed and Sealed this
Twenty-second Day of October, 2013

Teresa Stanek Rea
*Deputy Director of the United States Patent and Trademark Office*